(12) United States Patent
Becher et al.

(10) Patent No.: US 6,363,144 B1
(45) Date of Patent: Mar. 26, 2002

(54) METHOD OF ADMINISTERING SUPPLEMENTARY SERVICES IN A COMMUNICATIONS NETWORK

(75) Inventors: Reinhard Becher, München (DE); Manfred Leitgeb, Gramatneusiedl (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/360,359

(22) Filed: Jul. 23, 1999

Related U.S. Application Data

(63) Continuation of application No. PCT/DE98/00177, filed on Jan. 21, 1998.

(51) Int. Cl.[7] .............................. H04M 3/42; H04Q 7/20
(52) U.S. Cl. .............................. 379/211.01; 379/221.01; 379/211.02; 455/445
(58) Field of Search ................. 379/201.01–201.12, 379/207.01, 207.16, 211.01, 211.02, 219, 220.01, 221.01, 221.15; 455/432, 433, 439, 445, 414, 422; 370/351, 352

(56) References Cited

U.S. PATENT DOCUMENTS

| | | | |
|---|---|---|---|
| 5,504,804 A | * 4/1996 | Widmark et al. | 455/414 |
| 5,517,563 A | 5/1996 | Norell | |
| 5,734,699 A | * 3/1998 | Lu et al. | 455/422 |
| 5,867,784 A | * 2/1999 | Lantto | 455/432 |
| 5,890,064 A | * 3/1999 | Widergen et al. | 455/445 |
| 6,005,845 A | * 12/1999 | Svennesson et al. | 370/260 |
| 6,044,264 A | * 3/2000 | Houtari et al. | 455/414 |
| 6,058,303 A | * 5/2000 | Astrom et al. | 455/413 |
| 6,122,510 A | * 9/2000 | Granberg | 455/433 |

OTHER PUBLICATIONS

Published International Application No. 96/04754 (Slater et al.), dated Feb. 15, 1996.
Published International Application No. 94/10813 (Lantto), dated May 11, 1994.
Published International Application No. 94/10814 (Lantto), dated May 11, 1994.
Digital cellular telecommunications system (Phase 2+); Customized Applications for Mobile network Enhanced Logic (CAMEL); Service definition (Stage 1) (GSM 02.78), GSM Technical Specification, Nov. 1995, pp. 1–17.

* cited by examiner

*Primary Examiner*—Ahmad Matar
*Assistant Examiner*—Benny Q. Tieu
(74) *Attorney, Agent, or Firm*—Herbert L. Lerner; Laurence A. Greenberg; Werner H. Stemer

(57) ABSTRACT

A method provides that an initiating message is sent from a first service switching unit to a service control unit assigned to a supplementary service. In the service control unit there then takes place a comparison of a protocol supported by the first switching unit with a protocol necessary for the requested supplementary service. According to the result of the comparison, a second service switching unit, which can support the protocol necessary for the requested supplementary service, is determined, and a rerouting to the service switching unit is initiated.

16 Claims, 6 Drawing Sheets

DestRouteAddress:
<M-SSP-Id(2)><IN-Ind><SCP/CSE-Address><Port-Id><CorrId>

M-SSP-Id(2) := <CC><NDC><M1M2>
　　　　　CC := Country Code
　　　　　NDC := Network Code
　　　　　M1M2 := Switching Code IN-Ind := h'B oder h'C
SCP/CSE-Address := <CC><SCP-Id>
　　　　　CC := Country Code
　　　　　SCP-Id := Code for SCP
Prot-ID := Protocol Identity , z.B.: CAP phase 1,2,3 o. INAP 1,2,3
CorrId := Correlation Information for entry in SCP

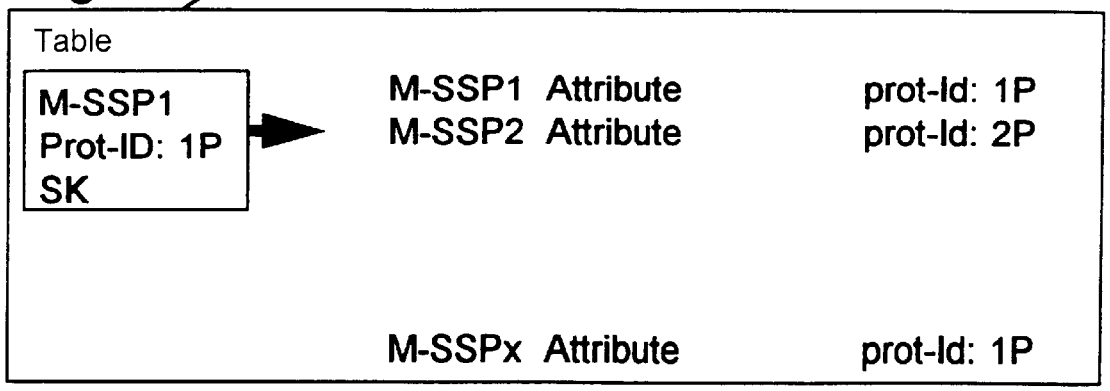
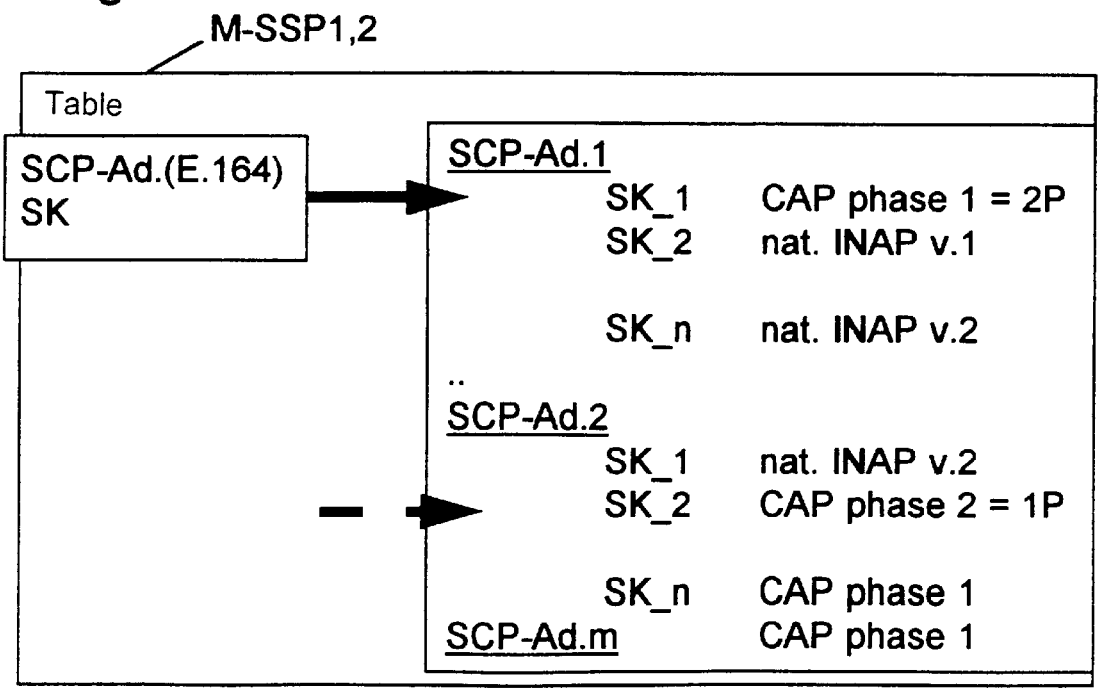

METHOD OF ADMINISTERING SUPPLEMENTARY SERVICES IN A COMMUNICATIONS NETWORK

CROSS-REFERENCE TO RELATED APPLICATION

This application is a continuation of copending International Application PCT/DE98/00177, filed Jan. 21, 1998, which designated the United States.

BACKGROUND OF THE INVENTION

Field of the Invention

The invention relates to a method of administering supplementary services in a communications network and to a service control unit or service switching unit configured for the method. The supplementary services are capable of being used in accordance with an intelligent network structure.

Communications networks are configured as fixed networks or mobile communications systems, such as the known GSM mobile radio network (Global System for Mobile Communications) and have interconnected switching centers. In mobile radio networks, base stations are respectively connected to the switching centers and can be used for connecting communication terminals via an air interface. The communication terminals permit network access for a subscriber of the mobile communications system. The switching centers also create the gateway to further networks, for example data transmission networks or a fixed network.

It is also known from the GSM mobile radio network to use memory units in which subscriber-specific data about the services of the network are respectively stored. One of the memory units realizes the so-called home location register, which is generally at a permanently defined location and in which the data on which the registration of the subscriber is based are stored. A memory unit is provided for the location of the mobile subscriber at any given time, as a so-called visitor location register. Depending on the location of the mobile subscriber, the memory unit for the visitor location register in which the data specific for the subscriber are located also changes.

The supplementary services with which the invention is concerned are to be realized in accordance with an intelligent network topology by independent service control units. The service control units and the profiles stored therein of the supplementary services, including the information necessary for their realization, are consequently modifiable independently of the mobile communications network. It is known from Published, Non-Prosecuted German Patent Application P 44 42 305 A that the services which can be used in an intelligent network are initiated in a service switching unit in order to leave the customary call processing and consequently activate access to supplementary services. Such service switching units are generally realized in the switching centers.

It is generally known to provide a service indicator as a subscriber-individual subscriber datum in the respective subscriber database and, by evaluating the service indicator during call handling in the case of an incoming or outgoing call, to initiate branching to a service control unit specified in a subscriber database of the intelligent network.

Also known, from "The CAMEL Feature, Proposed Revisions To The Stage 1 Description", from ETSI/STC/SMG1. 14.03.95, GSM 02.78, Version 0.4.0, pages 1–14, is a so-called customized application for mobile network enhanced logic (CAMEL) platform, with which the support of supplementary operator-specific services for subscribers is to be made possible. Consequently, an operator-specific supplementary service can be used even beyond the network and service limits of a communications network. This is possible if the service switching unit initiating the supplementary service can process the required protocol (CAP—CAMEL application part) for the service requested and if signaling messages from and to the home location register and the service control unit of the supplementary service can be exchanged beyond the network limits.

A prerequisite for a subscriber to use the supplementary service is that the service switching unit with which the subscriber is connected can support the supplementary service with the corresponding protocol. The full-coverage provision of the supplementary service consequently requires conversion of all the service switching units and a signaling message exchange for the selection of one of the corresponding protocols.

SUMMARY OF THE INVENTION

It is accordingly an object of the invention to provide a method of administering supplementary services in a communications network which overcome the above-mentioned disadvantages of the prior art methods and devices of this general type, in which supplementary services are accessible to a greater number of users and entails only a low retrofitting effort.

With the foregoing and other objects in view there is provided, in accordance with the invention, an improved method of administering supplementary services in a communications network having connection equipment, a gateway for connecting to at least one further network, networked switching centers connectable via the connection equipment to communication terminals for permitting subscriber access and via the gateway to the at least one further network, service switching units connected to the connection equipment and the gateway, and at least one service control unit controlling a supplementary service of the supplementary services, the improvement which comprises:

sending an initiating message from a first service switching unit of the service switching units serving a subscriber to the at least one service control unit;

performing a comparison of a first protocol supported by the first service switching unit with a second protocol necessary for the supplementary service; and determining a second service switching unit of the service switching units that can support the second protocol necessary for the supplementary service, and rerouting to the second service switching unit in dependence on a result of the comparison.

The method according to the invention of administering supplementary services provides that the initiating message is sent from the first service switching unit, serving a subscriber, to the service control unit assigned to the supplementary service. In the service control unit there then takes place a comparison of a protocol supported by the first service switching unit with a protocol necessary for the supplementary service. Depending on the result of the comparison, i.e. if the protocol supported by the first service switching unit is not adequate for supporting the supplementary service, a second service switching unit, which supports the protocol necessary for the supplementary service is determined. A rerouting to the second service switching unit is then initiated.

New supplementary services can be initially introduced using the method according to the invention in only one service switching unit and nevertheless be offered in the entire network and in visited networks that support a CAMEL phase 1. This considerably reduces the effort for introducing supplementary services. The procedure also makes it much easier to carry out a test of a new supplementary service.

The method according to the invention can be used if the calling subscriber or the called subscriber uses a supplementary service that is supported by a service control unit. It can similarly be used if the first service switching unit has been selected by call forwarding. Managing the entries on the protocols available in the individual service switching units just in one or more service control units makes it possible for the entries to be easily maintained and amended. The service switching units do not have to be adapted to the same extent.

It is consequently also possible to use non-standardized protocols, for example ETSI Core INAP and network-specific variants for mobile radio networks (for example TELECOM INAP), or various CAP (CAMEL application part) versions, which are supported both in the network of the subscriber registered for the supplementary service and in a visited network if only a single service switching unit or a few service switching units support the specific protocol. For roaming subscribers, the necessary prerequisite is that CAP phase 1 is supported by the respective service switching unit.

According to an advantageous development of the invention, particulars on the protocol required for the supplementary service are stored in the service control unit, on the basis of which the second service switching unit is selected. This reduces the signaling effort and makes it easy for the entries on the protocols to be amended. Particulars on a plurality of service switching units, designating the protocols available there and further attributes, are advantageously also stored in the service control unit. This also reduces the signaling effort between the service control unit and the service switching units.

According to a further advantageous development of the invention, a service switching unit which is in a specific relationship with the first service switching unit is selected as the second service switching unit. If there is a possibility of selection between a plurality of service switching units, an expedient selection can be made with knowledge of the first service switching unit.

A service key for the supplementary service and an address of the first service switching unit are advantageously used for selecting the second service switching unit, with the result that a second service switching unit close to the first service switching unit is determined with the aid of a table. As an alternative to distance-related criteria, cost and effort considerations or the specific agreements between the operators of various communications networks may be used.

If particulars on a communications-network-specific address of the second service switching unit (for example an E.164 address in the GSM mobile radio system) are also included, it is possible to dispense with a further conversion of a designation of the service to an address of the service control unit.

The connection between the first service switching unit and the service control unit is advantageously cleared after the comparison, in order to reduce the switching effort in the network. The data received by the first service switching unit during the dialog are buffer-stored in the service control unit and provided with correlation information, in order to have the buffer-stored data available again when setting up the communication between the second service switching unit and the service control unit.

A further development of the invention provides that a routing address is created for the rerouting, the address includes an address of the second service switching unit, an indicator for the rerouting of the supplementary service, an address of the service control unit, and a protocol indicator. Consequently, the immediate setting up of a connection between the second service switching unit and the service control unit is simplified.

According to a further advantageous development of the invention, particulars on the supplementary service requested by the subscriber, which are designated by correlation information, are stored in the service control unit. The correlation information is transferred as part of the rerouting address, with the result that, when a connection is set up between the second service switching unit and the service control unit, an assignment of the connection with the supplementary service and the particulars stored with respect to it is possible. A timing circuit, which for a predeterminable time period expects the setting up of a connection with the second service switching unit, is advantageously included in the service control unit. If this time period is exceeded, the buffer-stored particulars are erased. These measures serve the purpose of not unnecessarily tying up the resources in the event of a malfunction.

A decentralized introduction of extended possibilities for supplementary services is alternatively permitted by using a service key and an address of a service control unit intended for the supplementary service in a service switching unit as a basis for selecting a protocol for signaling with respect to the service control unit. This information is included in the CAMEL subscriber information (CSI) defined in CAMEL phase 1. If required, the CSI (O_CSI; T_CSI) is sent from the home location register to the switching center of the network gateway or to the visitor location register. Consequently, the register records of the home location register do not have to be extended by entries for protocol selection. This also dispenses with a great signaling effort, which arises when there are negotiations on the protocol to be used between the service switching unit and the service control unit. For supporting supplementary services, the service switching units can be retrofitted step-by-step with the corresponding protocols.

The method according to the invention also opens up the possibility of offering new supplementary services quickly and easily if the first and second service switching units belong to different communications networks. Corresponding agreements among the network operators consequently allow new services to be available for a large number of subscribers with little effort. This also makes it possible for individual communications networks to specialize in particular supplementary services.

If the communications network is configured as a mobile radio network, for example a GSM, PCS1900, AMPS, DAMPS or a mobile communications system defined in UMTS, FPLMTS or CTM, a supplementary service for which the subscriber is registered can also be used when the subscriber leaves his own network and is in the range of networks with whose operators corresponding agreements exist. In this case, the service which requires a protocol going beyond CAMEL phase 1 for handling can also be directly supported in visited networks if there are corresponding agreements. If no agreement with the visited operator exists, the service can be used by carrying out a rerouting to a service switching unit in the home network of the subscriber. This wide availability of a supplementary service is important for marketing the service and for rapid acceptance among subscribers.

Other features which are considered as characteristic for the invention are set forth in the appended claims.

Although the invention is illustrated and described herein as embodied in a method of administering supplementary services in a communications network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 7 is a table of entries with respect to service switching units in a service control unit; and FIG. 8 is a table of the entries with respect to protocols in the service switching unit that are required for supporting the supplementary service in interaction with the service control unit.

DESCRIPTION OF THE PREFERRED EMBODIMENTS

Figure 1:
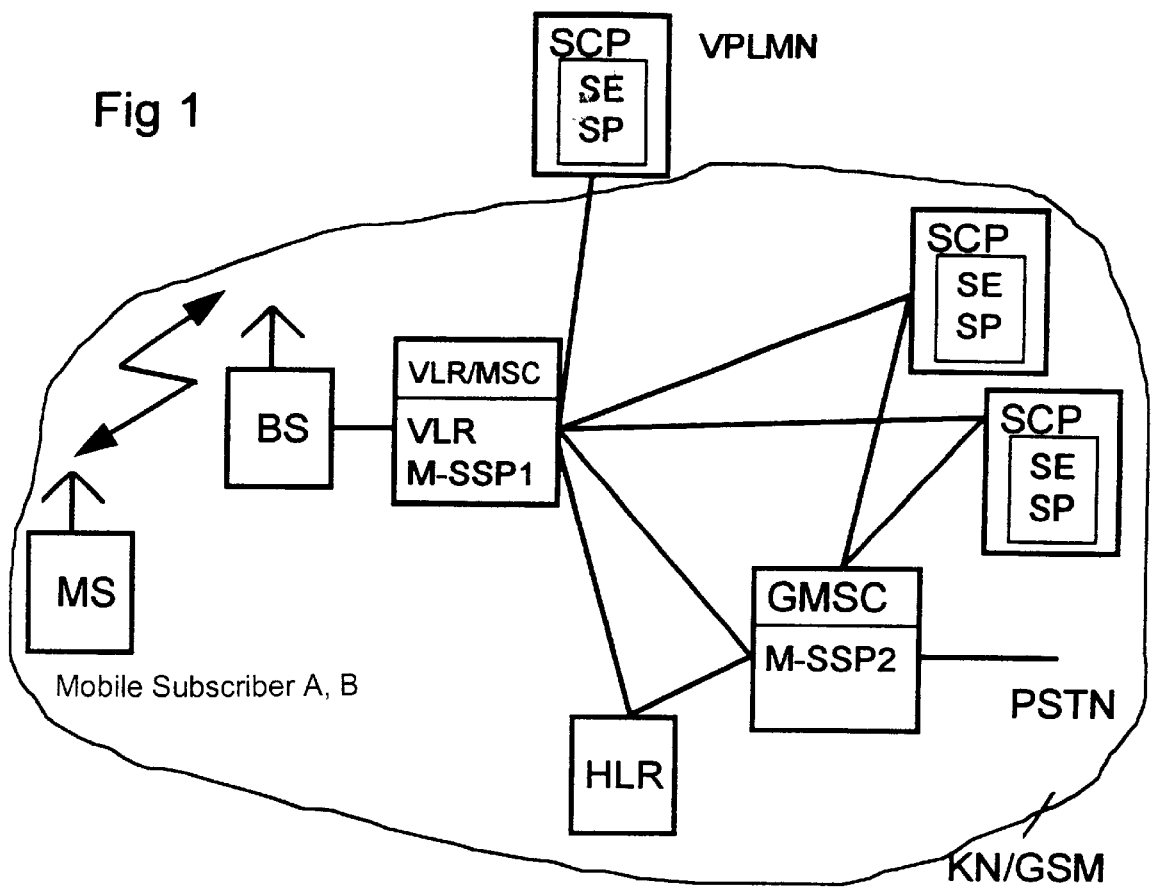
FIG. 1 is a diagrammatic, block diagram of a mobile radio system according to the invention.

In all the figures of the drawing, sub-features and integral parts that correspond to one another bear the same reference symbol in each case. Referring now to the figures of the drawing in detail and first, particularly, to FIG. 1 thereof, there is shown a communications network KN configured, for example, as a GSM mobile radio network GSM. For this purpose, it includes switching centers VLR/MSC, GMSC, which are interconnected. The switching center VLR/MSC establishes the connection to a mobile subscriber via a base station BS, which is wire-connected to the switching center VLR/MSC, and via an air interface between base station BS and a mobile station MS. The mobile station MS is a communication terminal of the mobile subscriber A, B.

The further switching center GMSC forms the network gateway into a further network, for example a fixed network PSTN. Furthermore, the mobile communications network GSM includes service control units SCP (are also referred to according to CAMEL phase 1 as the CSE—CAMEL service environment), which are respectively connected to at least one of the switching centers VLR/MSC, GMSC. In the case of these connections, it is not necessary for every service control unit SCP to be directly connected to every switching center VLR/MSC, GMSC, it suffices if they can be reached via the communications network GSM or other networks PSTN by use of a #7 signaling.

According to FIG. 1, a memory unit HLR, as a home location register of the mobile subscriber A, B, is an independent unit which is connected to both switching centers VLR/MSC, GMSC, represented here by way of example. Both switching centers VLR/MSC, GMSC include as a subsystem a service switching unit M-SSP1, M-SSP2. The switching center VLR/MSC of the mobile subscriber's A, B access facility at any given time also includes a visitor location register VLR, as long as the mobile subscriber is located in the base station area of the switching center VLR/MSC.

Connection setup messages going out from the mobile subscriber A are first of all processed in the switching center VLR/MSC in whose base station area the mobile subscriber A is located. This is where the inquiry of supplementary services SS (in particular so-called operator-specific services OSS) is to be initiated. Calls coming in for the mobile subscriber B, it being assumed here by way of example that these calls are from the fixed network PSTN and reach the switching center GMSC of the network gateway, must be processed in the switching center GMSC of the network gateway and the supplementary services SS available within the mobile radio network GSM or in other networks PSTN with which corresponding agreements exist must be inquired there.

The memory units HLR, VLR represent the home location register HLR and a visitor location register VLR of the mobile communications system GSM. The memory units HLR, VLR contain additional information on supplementary services SS, for which the subscriber A, B is registered, information (CSI) with respect to the supplementary services SS being entered in the visitor location register VLR by a location update. The additional information is in this case assigned to a subscriber A, B in addition to subscriber data of a subscriber A, B, for example in tabular form. The additional information may contain particulars on a plurality of supplementary services SS. The administration and utilization of supplementary services SS is to be explained with reference to the further figures.

Figure 2:
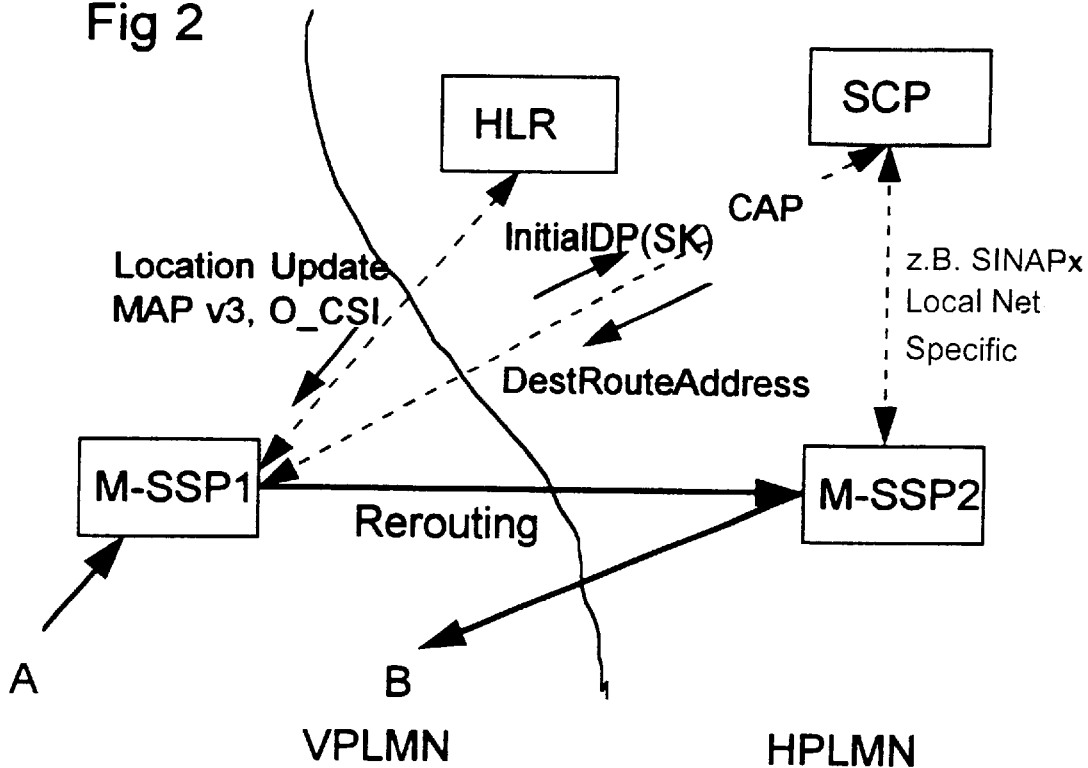
FIGS. 2–4 are block diagrams of equipment used in a first, second and third exemplary embodiment of a method for administering supplement services.
Figure 3:
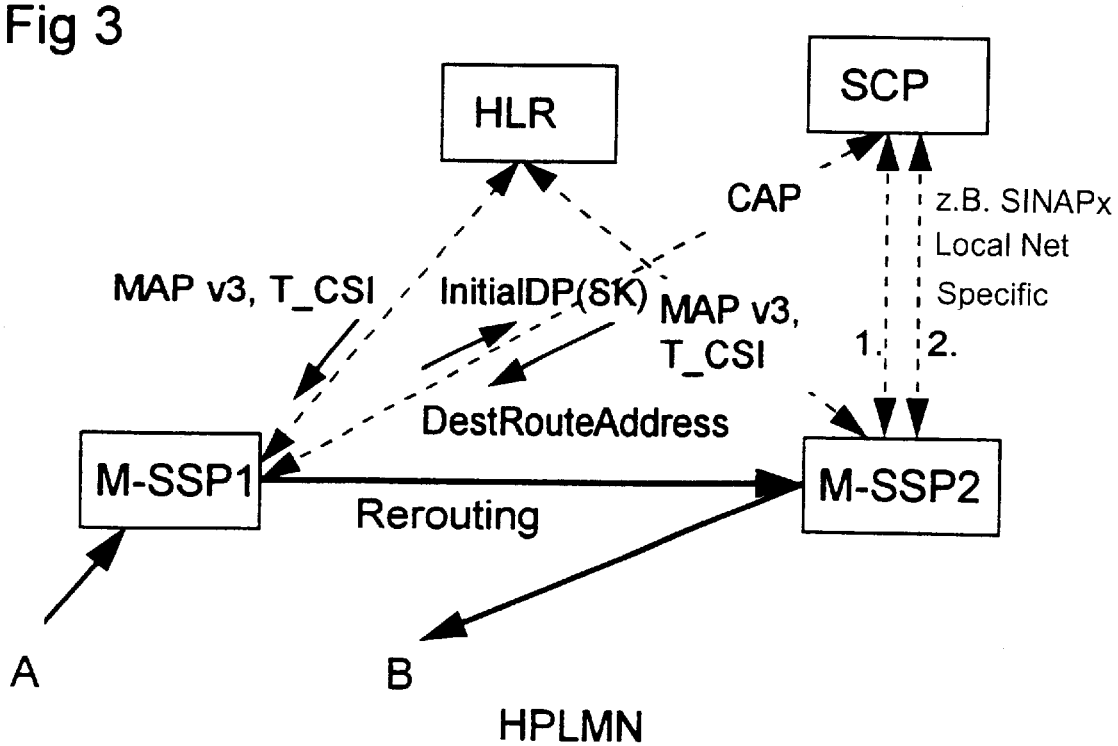
Figures 4, 5:
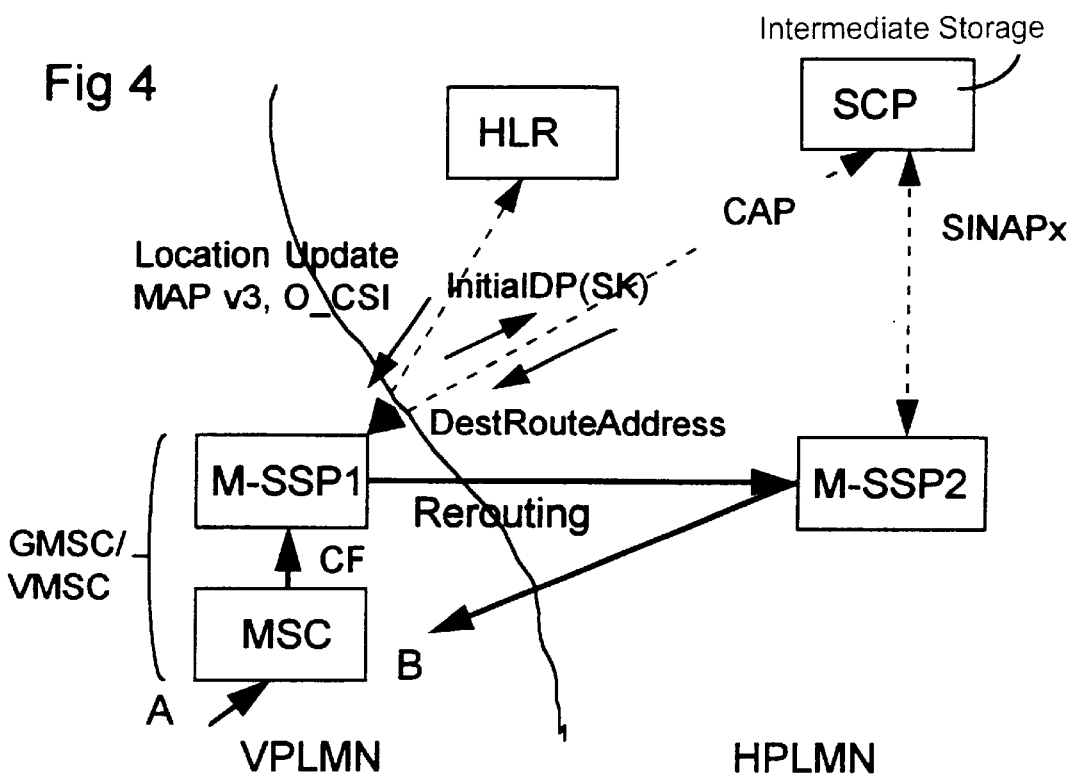
FIG. 5 is a table of rerouting information by way of example.

FIGS. 2 to 4 show basic diagrams for the sequence of the method according to the invention. In FIG. 2, during a location update of the subscriber A, the subscriber data CSI are transferred from the home location register HLR using a MAP v3 protocol into the visitor location register VLR in the case of the first service switching unit M-SSP1. If the subscriber A is registered for outgoing calls for the supplementary service SS, relevant subscriber information O_CSI is additionally transferred and stored in the visitor location register VLR and evaluated by the service switching unit M-SSP1 when an outgoing call is initiated by the subscriber A. In this evaluation, it is determined which service control unit offers the supplementary service SS. A signaling with an initiating message InitialDP takes place with respect to the service control unit SCP by use of a protocol CAP, which includes a service key SK with respect to the supplementary service SS.

If the first service switching unit M-SSP1 does not support the protocol 2P required for the supplementary service SS, the service control unit SCP determines a second service switching unit M-SSP2 that is capable of this, and sends to the first service switching unit M-SSP1 a message which contains a new destination number (DestRouteAddress) according to FIG. 5. On the basis of the rerouting information DestRouteAddress, a connection setup is initiated to the second service switching unit M-SSP2, which thereupon makes the supplementary service SS available to the subscriber A by use of the required home-network-specific or service-specific protocol 2P, for example a SINAPX protocol, with the service control unit SCP, and establishes the connection to the called subscriber B.

In the case of this constellation, the calling subscriber A is registered in his home network HPLMN for a supplementary service SS, which is also offered only there and is supported with the corresponding protocol 2P by a service switching unit M-SSP2. He can also use this service SS in a visited network VPLMN.

FIGS. 3 and 4 describe slightly modified constellations for incoming calls. According to FIG. 3, this is a single network HPLMN in which a rerouting is carried out, since not all the service switching units M-SSP1, 2 make the protocol required for the supplementary service SS available. The rerouting for the case represented in FIG. 3 would function in the same way, however, if the two service switching units M-SSP1 and M-SSP2 were to lie in different networks. The supplementary service SS concerns the called subscriber B. By an inquiry in the home location register HLR of the latter, particulars T_CSI on the supplementary service SS requested by him are made available to the first service switching unit M-SSP1, whereupon, as above, the signaling with the service control unit SCP and the rerouting take place. The second service switching unit M-SSP2 receives first of all, by use of a first dialog with the service control unit SCP, the subscriber call number MSISDN of the called subscriber B and consequently likewise the subscriber-specific particulars T_CSI on the supplementary service SS from the home location register HLR of the called subscriber B, and can offer this service SS to the called subscriber B by use of a second dialog with the service control unit SCP.

FIG. 4 describes the case in which call forwarding CF is operated via a switching center MSC and the first service switching unit M-SSP1 for the called subscriber B. In the case of a registration of an outgoing supplementary service SS, additional subscriber information O_CSI would be additionally made available by the home location register HLR (during location update or during an inquiry of the home location register HLR). Here again, the supplementary service SS is offered beyond the limits of two networks HPLMN, VPLMN. The handling of the supplementary service SS is comparable to that in the case of outgoing calls.

Figure 6:
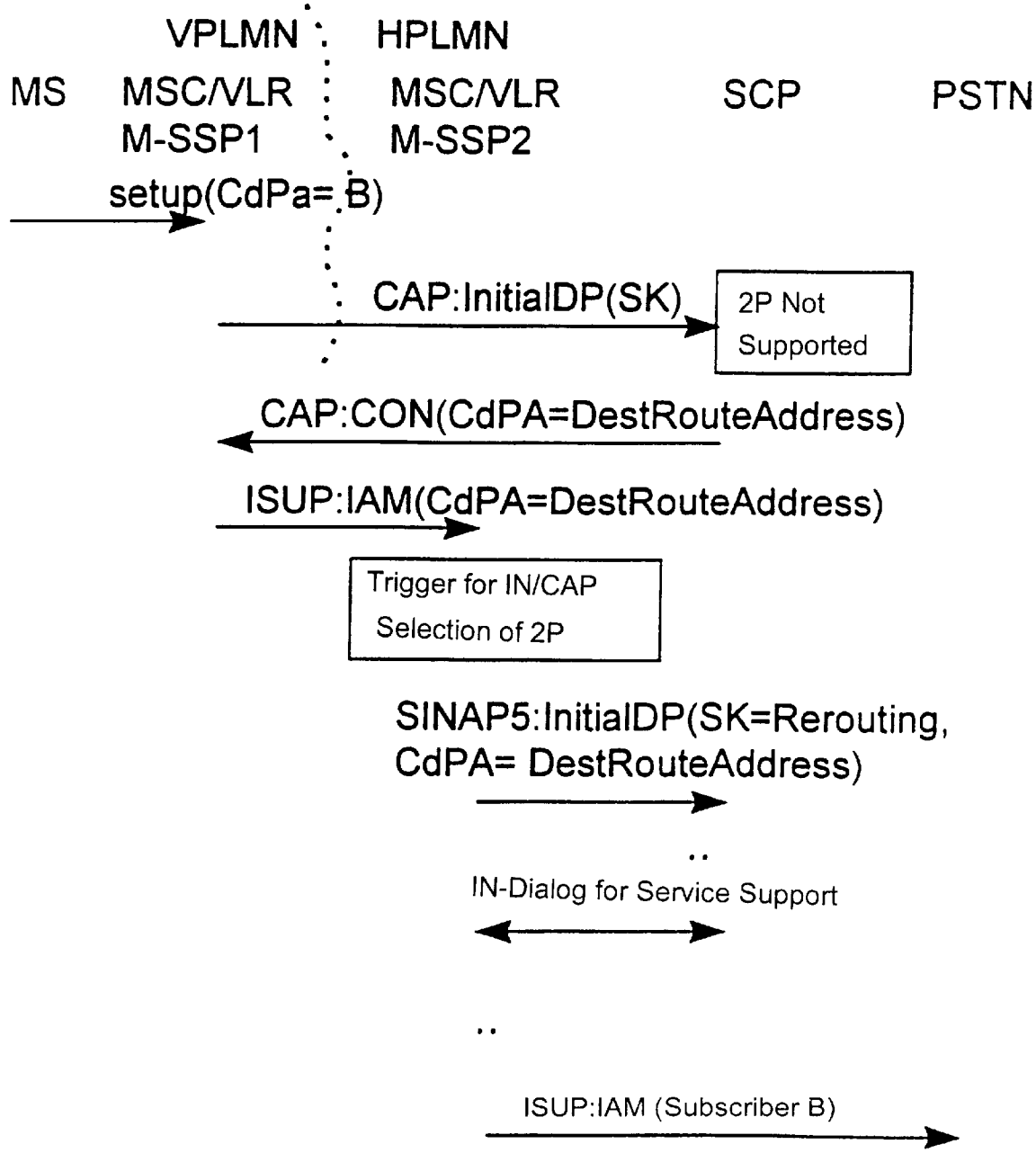
FIGS. 6a and 6b are signaling sequences of the method by way of example of an outgoing call and an incoming call.
Figure 6:
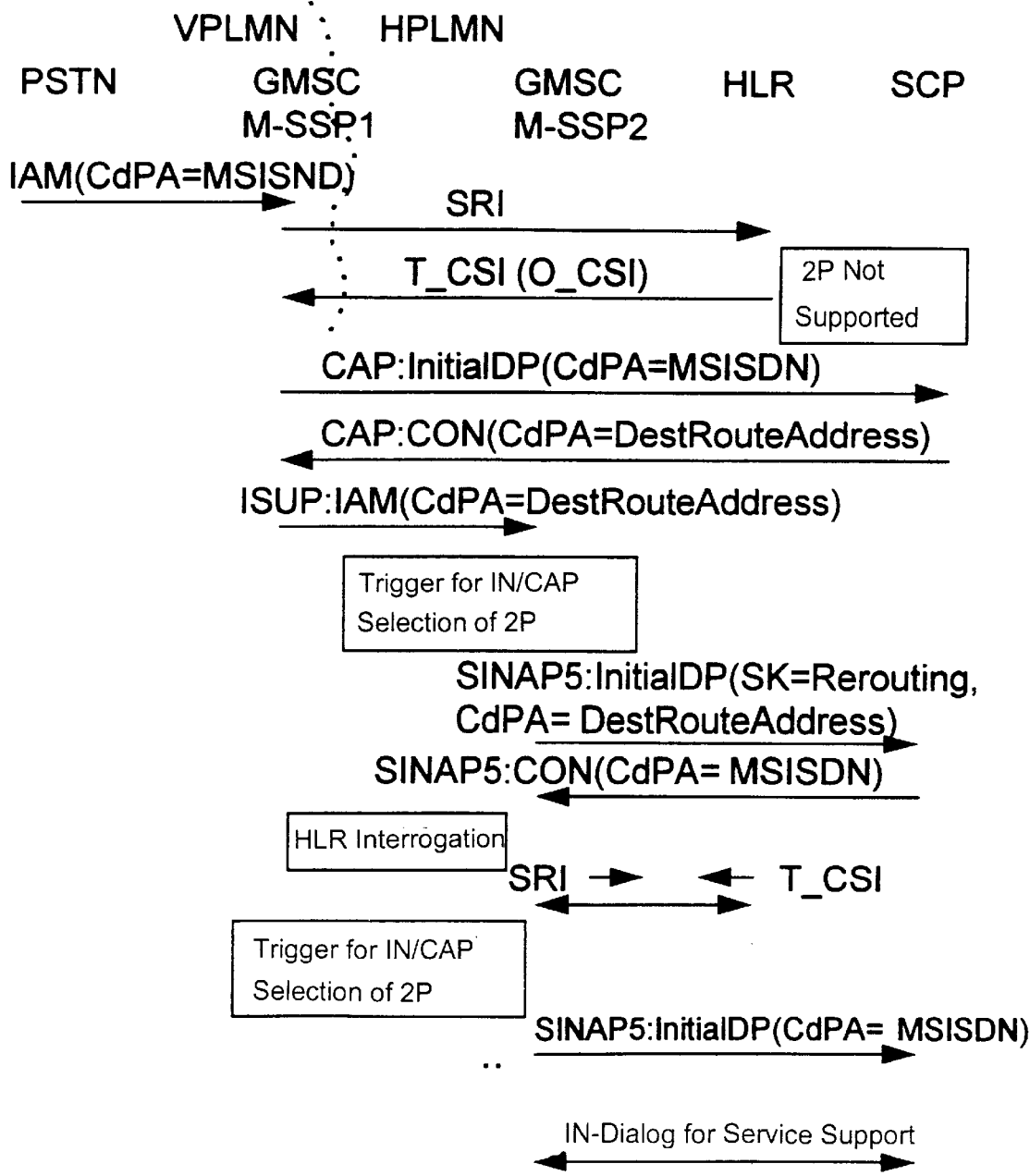

In the case of the call setup according to FIG. 6a, this proceeds from the mobile subscriber A via the mobile station MS (communication terminal). The connection setup message setup reaches the switching center VMSC/M-SSP1 of a visited network VPLMN in whose base station area the mobile station MS is located. In the switching center VMSC/M-SSP1, when there is an activated supplementary service SS, the associated subscriber-specific information O_CSI is made available by the visitor location register VLR. If this is not the case, the call setup takes place without utilizing supplementary services SS.

If the supplementary service SS is activated, the address SCP-Ad of the service control unit SCP for the supplementary service SS and for the service key SK is determined by the first service switching unit M-SSP1 from the additional information of the visitor location register VLR (O_CSI) with respect to the calling subscriber A, for designating the service SS. In the case of a plurality of competing supplementary services SS, prioritizing is to be provided within the additional information, for example on the basis of a price comparison or the point in time of activation. On the basis of the designation SCP-Ad of the service control unit SCP and of the service key SK, the protocol to be used protID=1P is selected in a way corresponding to FIG. 8.

The selection capability represented in FIG. 8 does not have to be provided in all service switching units M-SSP1, M-SSP2. If only one protocol (CAP phase 1) is offered, it is possible to dispense with the comparison. The selection capability on the basis of the table can be retrofitted step-by-step in the service switching units M-SSP1, M-SSP2. The table inquiry avoids negotiations on the protocol to be used between the service switching units M-SSP1, M-SSP2 and the home location register HLR or the service control unit SCP and saves signaling effort. This decentralized solution avoids complex databases in the home location register HLR or the service control unit SCP and can be introduced decentrally in the sense of a migration concept in the network KN.

By the method corresponding to FIG. 6a, a protocol 1P was selected for the signaling to the service control unit SCP. From the first service switching unit M-SSP1, a signaling is initiated on the basis of the protocol (CAMEL application part) CAP with an initiating message InitialDP containing the service key SK with respect to the service control unit SCP offering the supplementary service SS. The service control unit SCP takes from this signaling the service key SK and the identity of the first service switching unit M-SSP1.

According to FIG. 7, a comparison of the protocol 1P chosen for the signaling with the first service switching unit M-SSP1 with the protocol 2P required for the supplementary service SS then takes place in the service control unit SCP. The required protocol 2P can be derived from the service key SK, while the protocol 1P arises from the preceding signaling with the first service switching unit M-SSP1, for example the application context of the transport layer.

If it is established that the first service switching unit MSSP1 does not support the required protocol 2P for the desired supplementary service SS (if a more recent, downward-compatible protocol version supporting the supplementary service is established, this is not the case), the table from FIG. 7 is used to select the second service switching unit MSSP2, which supports the required protocol 2P and is additionally close to the first service switching unit M-SSP1 spatially or by contractual agreements. The relationship is derived from the attributes for the individual service switching units M-SSP1, M-SSP2 and M-SSPn.

This relationship may be defined by corresponding agreements between various network operators or by the technical circumstances, for example a subset of the service switching units M-SSP1, M-SSP2 of a manufacturer, regional or cost aspects.

In a way corresponding to the identity M-SSP-Id(2) of the second service switching unit M-SSP2, rerouting information DestRouteAddress is then built up and sent with a message CON to the first service switching unit M-SSP1. The selection process described is conducted by a controller SE of the service control unit SCP. At the same time, the data received with the initiating message InitialDP is stored in a storage device SP, which also contains the table entries.

The setup of the rerouting information DestRouteAddress is illustrated in FIG. 5. This brings together the identity MSSP-Id(2) of the second service switching unit M-SSP2, containing country code CC, network code NDC and switching code M1M2, an indicator IN-Ind for the rerouting of the supplementary service SS in the sense of an intelligent network IN, an address SCP/CSE address of the service control unit SCP, containing country code CC and service control unit identity SCP-Id, a protocol identity Prot-Id-2P, and correlation information CorrId. The indicator IN-Ind is advantageously selected from the non-selectable character set, for example hexadecimal h'B or h'C.

The first service switching unit M-SSP1 carries out the rerouting with an inter-exchange signaling, for example on the basis of ISUP or TUP, and sets up a connection to the second service switching unit M-SSP2 with a message ISUP:IAM. The first service switching unit M-SSP1 is otherwise merely a transit node. Its connection to the service control unit SCP is cleared down.

After the successful rerouting, the designation SCP-Ad of the service control unit SCP and of the service key SK is again used as a basis for selecting a protocol ProtID-2P, which in this case can support the supplementary service SS. A dialog corresponding to the procedure in intelligent networks IN takes place between the second service switching unit M-SSP2 and the service control unit SCP, for example on the basis of a SINAP5 protocol 2P. The second service switching unit MSSP2 in this case transfers the received destination call number of the called subscriber B and the service key SK, which indicates the rerouting. This facilitates the service handling for the service control unit SCP.

On the basis of the correlation information CorrId and the identity of the second service switching unit M-SSP-Id(2) communicated in this dialog, the service control unit SCP finds the assignment to the previously stored data. The comparison between the protocol 2P offered by the second service switching unit M-SSP2 and the required protocol 2P is successful this time, whereupon the supplementary service SS is carried out. The further sequence is dependent on the particular features of the respective supplementary service SS. The connection to the called subscriber B is set up.

The controller SE of the service control unit SCP monitors a timing circuit with respect to the correlation information CorrId. If a time period before the signaling between the second service switching unit M-SSP2 and the service control unit SCP is exceeded, the entries belonging to this correlation information CorrId are erased. The supplementary service SS can then no longer be used for this connection request.

FIG. 6b shows an incoming call. The sequence of the connection setup therefore has the corresponding special features in comparison with FIG. 6a. In particular, the inquiry of the home location register HLR and the routing are correspondingly configured.

We claim:

1. An improved method of administering supplementary services in a communications network having connection equipment, a gateway for connecting to at least one further network, networked switching centers connectable via the connection equipment to communication terminals for permitting subscriber access and via the gateway to the at least one further network, service switching units connected to the connection equipment and the gateway, and at least one service control unit controlling a supplementary service of the supplementary services, the improvement which comprises:

sending an initiating message from a first service switching unit of the service switching units serving a subscriber to the at least one service control unit;

performing a comparison of a first protocol supported by the first service switching unit with a second protocol necessary for the supplementary service;

determining and selecting a second service switching unit of the service switching units that can support the second protocol necessary for the supplementary service using a service key for the supplementary service and aided by a table such that the second service switching unit is close to the first service switching unit, and rerouting to the second service switching unit in dependence on a result of the comparison.

2. The method according to claim 1, wherein the subscriber is a calling subscriber.

3. The method according to claim 2, which comprises selecting the first service switching unit by call forwarding.

4. The method according to claim 1, wherein the subscriber is a called subscriber.

5. The method according to claim 1, which comprises storing particulars of the second protocol required for the supplementary service in the at least one service control unit and selecting the second service switching unit in dependence on the particulars of the second protocol.

6. The method according to claim 5, which comprises storing particulars of the service switching units, designating available protocols and further attributes, in the at least one service control unit.

7. The method according to claim 1, which comprises using a protocol identity and an address of the first service switching unit for selecting the second service switching unit with a result that the second service switching unit is close to the first service switching unit and is determined with an aid of a table.

8. The method according to claim 1, which comprises clearing a connection between the first service switching unit and the at least one service control unit after the comparison.

9. The method according to claim 1, which comprises creating a routing address for the rerouting step, the routing address containing an address of the second service switching unit, an indicator for the rerouting of the supplementary service, an address of the at least one service control unit, and a protocol identity.

10. The method according to claim 9, which comprises storing particulars on the supplementary service requested by the subscriber, which are designated by correlation information, in the at least one service control unit, and the correlation information is transferred in the routing address.

11. The method according to claim 1, which comprises providing a timing circuit, which for a predeterminable time period expects a setting up of a connection with the second service switching unit, in the at least one service control unit.

12. The method according to claim 1, which comprises selecting one of the first protocol and the second protocol for signaling to the at least one service control unit from one of the first service switching unit and the second service switching unit on a basis of a service key and an address of the at least one service control unit.

13. The method according to claim 1, which comprises configuring the first service switching unit and the second service switching unit to belong to different communications networks.

14. The method according to claim 1, which comprises configuring the communications network as a mobile radio network.

15. In a communications network having connection equipment, a gateway for connecting to at least one further network, networked switching centers connectable via the connection equipment to communication terminals for permitting subscriber access and via the gateway for connecting to the at least one further network, and service switching units connected to the connection equipment and the gateway, a service control unit for controlling a supplementary service for the communications network, the service control unit, comprising:

a storage device for storing an initiating message received from a first service switching unit of the service switching units serving a subscriber; and a controller comparing a first protocol supported by the first service switching unit with a second protocol necessary for the supplementary service, said controller determining a second service switching unit of the service switching units supporting the second protocol necessary for the supplementary service using a service key for the supplementary service and aided by a table such that said second service switching unit is close to said first service switching unit, and said controller creating routing information for rerouting to said second service switching unit.

16. In a communications network having connection equipment, a gateway for connecting to at least one further network, networked switching centers connectable via the connection equipment to communication terminals for permitting subscriber access and via the gateway to the at least one further network, and at least one service control unit, an apparatus for switching a supplementary service in the communications network, the apparatus, comprising:

a service switching unit configured such that a protocol for signaling to the at least one service control unit selected on a basis of a service code and an address of the at least one service control unit;

a second service switching unit that can support the second protocol necessary for the supplementary service selected by using a service key for the supplementary service and aided by a table such that said second service switching unit is close to said first service switching unit, and rerouting to said second service switching unit depending on a result of an comparison.

* * * * *

UNITED STATES PATENT AND TRADEMARK OFFICE
CERTIFICATE OF CORRECTION

PATENT NO. : 6,363,144 B1
DATED : March 26, 2002
INVENTOR(S) : Reinhard Becher et al.

It is certified that error appears in the above-identified patent and that said Letters Patent is hereby corrected as shown below:

<u>Title page,</u>
Item [30], should read as follows:

-- Jan. 23, 1997        (DE) .........  197 02 322.3 --

Signed and Sealed this

Twenty-seventh Day of August, 2002

Attest:

JAMES E. ROGAN
Attesting Officer        Director of the United States Patent and Trademark Office